H. KLINGLER.
RESILIENT TIRE.
APPLICATION FILED DEC. 8, 1908.

Reissued Oct. 26, 1909.

13,028.

Witnesses:
G. Wedemeier
H. W. Grosbrick

Inventor:
Hermann Klingler,
by Howard A. Coombs
his attorney

UNITED STATES PATENT OFFICE.

HERMANN KLINGLER, OF SITTERDORF, SWITZERLAND.

RESILIENT TIRE.

13,028. Specification of Reissued Letters Patent. Reissued Oct. 26, 1909.

Original No. 865,396, dated September 10, 1907, Serial No. 295,315. Application for reissue filed December 8, 1908. Serial No. 466,578.

*To all whom it may concern:*

Be it known that I, HERMANN KLINGLER, a citizen of the Swiss Republic, residing at Sitterdorf, Canton Thurgau, in Switzerland, have invented certain new and useful Improvements in Resilient Tires, of which the following is a specification.

The present invention relates to a tire especially adapted for use with motor road vehicles and comprises a construction whereby both side-slip and skidding are to a great extent overcome and whereby also mud, snow and the like are prevented from accumulating on the tire.

The improved tire is represented in the accompanying drawing in which—

Figure 1:
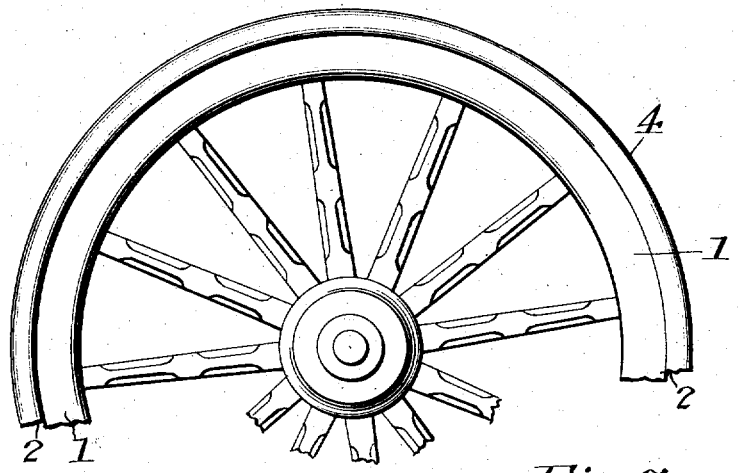
Figure 3:
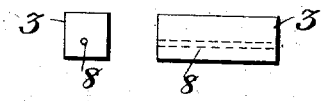
Figure 2:
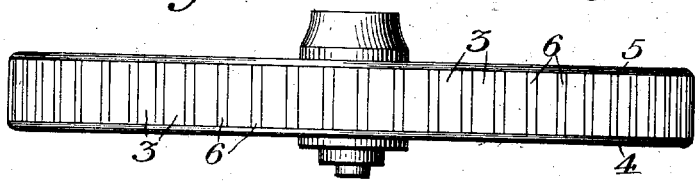
Figure 4:
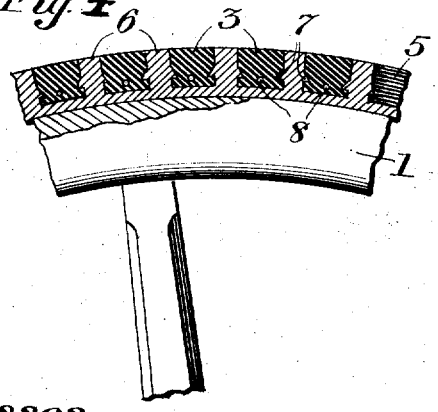
Figure 5:
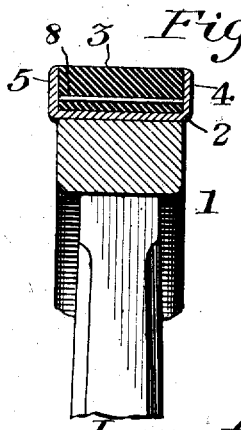

Figure 1 is a fragmentary side elevation of the tire in use. Fig. 2 a plan view. Fig. 3 a detail view. Fig. 4 a fragmentary longitudinal section and Fig. 5 a cross-section.

The tire comprises a rim located upon a felly 1 of a wheel of any kind and provided with elastic cushions 3, the latter consisting for instance of rubber and in the present construction being of the form shown in Fig. 3.

The rim consists of a base 2 and flanges 4, 5 connected by cross-pieces 6 so that open pockets are produced in which the elastic cushions 3 are located.

The cushions 3 are of such shape that they entirely fill the pockets when slightly compressed and they extend to the height of the cross pieces 6.

In order to prevent the cushions from falling out the cross-pieces 6 are laterally provided for the whole of their length with noses 7 so shaped that the cushions can be easily inserted from the exterior but cannot fall out being engaged by said noses similarly to a barbed hook. The security of the cushions may be further increased by introducing thereinto spring-steel-wires 8 parallel to the cross-pieces 6.

When using the tire the rubber cushions 3 are so compressed that only the edges of the cross pieces 6 and the flanges 4, 5 engage the road surface. When the compressed part of the rim is relieved, the cushions 3 expand owing to their elasticity, whereby at the same time the adhering mud, snow or the like is thrown off; the cushions act as buffers so that each part of the wheel used is entirely freed of mud and the like before it comes into use again.

Since mud ice or snow cannot accumulate on the tire side slip or skidding is to a great extent prevented and motor vehicles are thus rendered more safe on hills and on frozen or snow covered roads.

What I claim as my invention and desire to secure by Letters Patent of the United States is:—

1. A tire comprising a metal rim having cross-pieces formed integral therewith, blocks of resilient material resting on said rim between said cross-pieces with their outer surfaces flush with the tops of said cross-pieces, and wires embedded in said blocks to secure them in place, whereby adhering mud or snow is detached by the resiliency of said blocks.

2. The combination with the metal rim of a wheel, of outwardly projecting flanges and cross-ribs formed thereon, blocks of resilient material inserted between said flanges and said ribs, and spring-steel wires embedded in said blocks and abutting against said flanges.

3. A tire comprising an exteriorly flanged rim, a plurality of cross-pieces integral with said rim and forming with the flanges thereof exteriorly open pockets, resilient cushions located in said pockets, lateral noses on said cross-pieces, and metal wires traversing said cushions, to secure the latter in the said pockets, substantially as described.

4. A wheel tire comprising a rim having integral lateral flanges and cross-pieces connecting said flanges at intervals, said cross-pieces being provided with laterally projecting noses, and blocks of resilient material, held in the pockets, formed by said flanges and cross-pieces, by engagement with the said noses, said blocks having their surfaces flush with the outer surfaces of said flanges and cross-pieces, whereby adhering mud or snow is automatically detached by the resiliency of said blocks.

HERMANN KLINGLER.

Witnesses:
WILH. LANVY,
JOH. DUTLI.